May 27, 1924.

J. HUTCHINS

COOKING UTENSIL

Filed Dec. 12, 1922

1,495,594

Inventor
JOHN HUTCHINS
By Attorney
Richard J. Cook

Patented May 27, 1924.

1,495,594

UNITED STATES PATENT OFFICE.

JOHN HUTCHINS, OF AUBURN, WASHINGTON.

COOKING UTENSIL.

Application filed December 12, 1922. Serial No. 606,527.

*To all whom it may concern:*

Be it known that I, JOHN HUTCHINS, a citizen of the United States, and a resident of Auburn, county of King, State of Washington, have invented certain new and useful Improvements in Cooking Utensils, of which the following is a specification.

My invention relates to improvements in cooking utensils, and more particularly to devices of that character known as double cookers or steamers, wherein the vessel which contains the substance to be cooked is suspended within an enclosing vessel wherein water may be contained.

It is the principal object of this invention to provide a device of the above character embodying an outside vessel and an inside cooking vessel having a perforated base for the purpose of draining, and to provide the outside vessel with an adjustable clamp whereby the inside vessel may be held at different positions of elevation within the outer vessel.

Other objects of the invention reside in the details of construction of the vessels and the clamp, and in the manner of using the utensil for cooking purposes. In accomplishing these and other objects of the invention, I have provided the improved details of construction, preferred forms of which are illustrated in the accompanying drawings, wherein—

Figure 1:
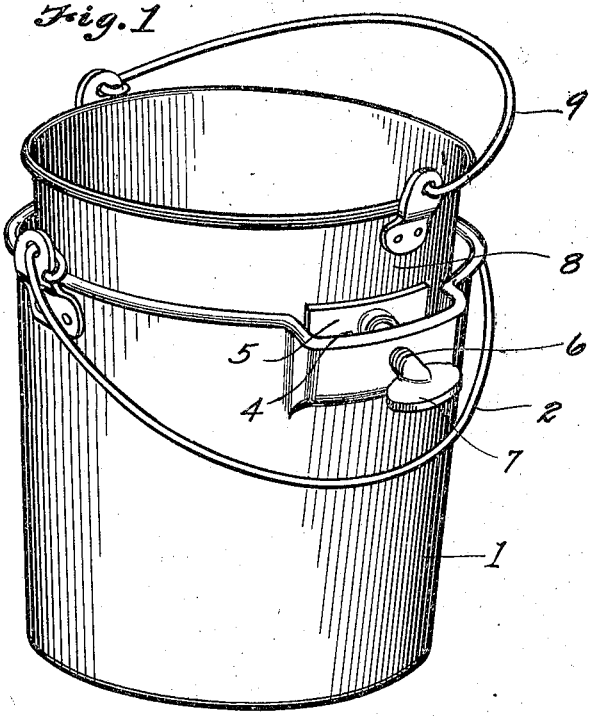
Figure 1 is a perspective view of a double cooker constructed in accordance with the present invention, particularly illustrating the clamp whereby the inner vessel is retained at adjusted positions within the outer vessel.

Referring more in detail to the drawings, 1 designates the exterior vessel which may be of bucket-like character, and is provided with a suitable bail 2 whereby it can be handled. At one side and near the upper edge the vessel has an inwardly pressed rib 3 and at a diametrically opposite point has an outwardly pressed portion, forming a pocket 4 wherein a clamping plate 5 is adapted to be disposed. The said plate being pivotally mounted on the inner end of a screw 6 that is threaded through the pocket wall and its outer has a turning head 7. The inner vessel 8 is similar in shape to the outside vessel but is of smaller diameter so that it may be freely moved into and from the outer vessel. It is equipped with a bail 9 and in its bottom wall has perforations 10 which permit it to be drained.

Figure 2:
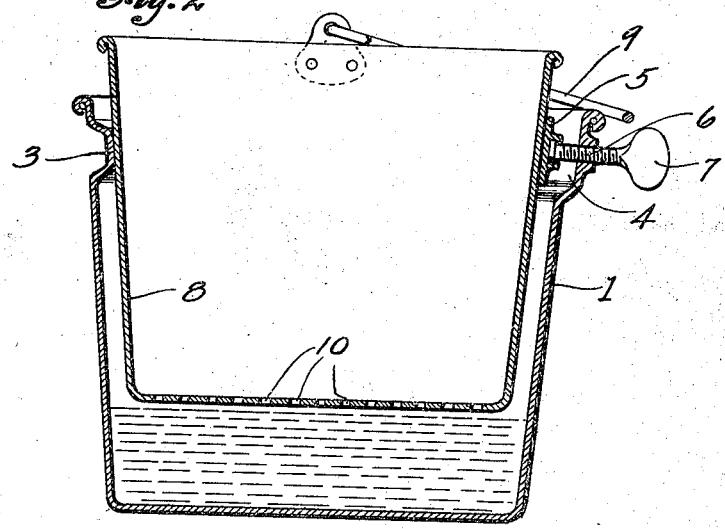
Figure 2 is a central vertical section of the same.

Assuming that two vessels are so constructed, in using the utensil the smaller vessel with the substance to be cooked therein is placed within the outer vessel, the latter being filled with water according to the requirements of the substance being cooked. For the purpose of steaming, the inner vessel would be held above the level of the water by means of the clamping plate which by virtue of its pivotal mounting on the screw, adjusts itself to the inclined surface of the inner vessel when the screw is tightened thereby holding the inner vessel firmly suspended above the water in spaced apart relation from the other vessel, but if it is desired to cook or boil the substance the plate is withdrawn within the pocket 4 thus permitting the inner vessel to be lowered into the water without its surface contacting with the plate. After cooking has been completed, if it is desired to drain off the water from the cooked substance, the inner vessel is raised above the water level and the clamp tightened against it as is illustrated in Figure 2, so that the water may be drained therefrom. The cooked substance may then be removed free from water.

It is readily apparent that with this construction the inner vessel can be held at any desirable level, can be used as a steamer or cooking vessel, and can be made in various sizes and shapes without departing from the spirit of the invention.

Having thus described my invention, what I claim as new therein and desire to secure by Letters Patent, is:

1. A cooking utensil of the character described, comprising in combination an outer vessel having an outwardly depressed pocket in the upper edge thereof, a clamp screw threaded through the wall of said pocket, a clamping plate pivotally fixed on the inner end of the screw and adapted to seat within the pocket, an inner vessel adapted to be suspended within the outer vessel by the tightening of the clamp screw against same, and having a perforated base whereby it may be drained.

2. A cooking utensil of the class described, comprising an outer vessel having an inwardly depressed rib in the side wall adjacent the top thereof, and an outwardly depressed pocket at a point diametrically opposite the rib, an inner vessel of smaller diameter than the outer and suspended within the outer vessel and having a perforated base, a clamping screw threaded through the wall of said pocket and a clamping plate pivotally mounted on the inner end of the screw, adapted to be tightened against the inner vessel by means of the screw to retain the inner vessel at different elevations.

Signed at Auburn, King County, Washington, this 5th day of August, 1922.

JOHN HUTCHINS.